(12) United States Patent
McDonald (10) Patent No.: US 10,399,503 B2
(45) Date of Patent: Sep. 3, 2019

(54) HOLDING APPARATUS

(71) Applicant: Peter Michael McDonald, Woodville (AU)

(72) Inventor: Peter Michael McDonald, Woodville (AU)

(*) Notice: Subject to any disclaimer, the term of this patent is extended or adjusted under 35 U.S.C. 154(b) by 0 days.

(21) Appl. No.: 15/767,780

(22) PCT Filed: Oct. 13, 2016

(86) PCT No.: PCT/AU2016/050959
§ 371 (c)(1),
(2) Date: Apr. 12, 2018

(87) PCT Pub. No.: WO2017/063039
PCT Pub. Date: Apr. 20, 2017

(65) Prior Publication Data
US 2018/0297535 A1    Oct. 18, 2018

(30) Foreign Application Priority Data
Oct. 14, 2015 (AU) ................... 201504199

(51) Int. Cl.
  *B60R 7/14* (2006.01)
  *F41A 23/26* (2006.01)
  *F41A 23/18* (2006.01)
  *A01M 31/02* (2006.01)

(52) U.S. Cl.
CPC .............. *B60R 7/14* (2013.01); *F41A 23/18* (2013.01); *F41A 23/26* (2013.01); *A01M 31/02* (2013.01)

(58) Field of Classification Search
CPC ............. Y10S 224/913; Y10S 224/916; Y10S 224/924; B60R 9/00; B60R 9/048
See application file for complete search history.

(56) References Cited

U.S. PATENT DOCUMENTS

| | | | | |
|---|---|---|---|---|
| 3,251,519 A | * | 5/1966 | Jones | B60R 9/0485 224/323 |
| 3,473,673 A | | 10/1969 | Porter | |
| 3,826,390 A | * | 7/1974 | Watson | B60R 9/0423 224/310 |
| 3,877,624 A | * | 4/1975 | Carson | B60R 9/0485 224/323 |
| 4,008,838 A | * | 2/1977 | Correll | B60R 9/0485 182/127 |

(Continued)

*Primary Examiner* — Brian D Nash
(74) *Attorney, Agent, or Firm* — Klarquist Sparkman, LLP (57) ABSTRACT

A holding apparatus mountable to a vehicle is provided. The apparatus comprises one or more mounting members; one or more rear holding members; one or more front holding members; and one or more clamping actuators operatively associated with the front and/or rear holding members. The one or more clamping actuators are capable of moving the front holding members and/or the rear holding members to thereby releasably, clampingly engage an object placed between the front and rear holding members. The apparatus may be particularly adapted for holding firearms. The apparatus may be particularly adapted for use with all-terrain vehicles (ATVs). Also provided are methods of holding and/or securing an object such as a firearm using the apparatus, before or after mounting the apparatus to a vehicle.

13 Claims, 10 Drawing Sheets

(56) References Cited

U.S. PATENT DOCUMENTS

| | | | | |
|---|---|---|---|---|
| 4,170,331 A * | 10/1979 | Faulstich | | E06C 5/24 |
| | | | | 182/127 |
| 4,262,834 A * | 4/1981 | Nutt | | B60R 9/0485 |
| | | | | 182/127 |
| 4,390,117 A * | 6/1983 | Fagan | | B60R 9/0485 |
| | | | | 182/127 |
| 4,618,083 A * | 10/1986 | Weger, Jr. | | B60R 9/0485 |
| | | | | 224/309 |
| 4,823,673 A | 4/1989 | Downing | | |
| 4,915,273 A | 4/1990 | Allen | | |
| 5,338,016 A * | 8/1994 | Howard | | B25B 1/103 |
| | | | | 269/208 |
| 5,791,610 A * | 8/1998 | Sanchez | | F41B 5/14 |
| | | | | 224/916 |
| 6,296,162 B1 * | 10/2001 | Englander | | B60R 9/048 |
| | | | | 224/323 |
| 6,554,264 B1 * | 4/2003 | Alford | | B25B 1/103 |
| | | | | 269/147 |
| 7,481,344 B2 * | 1/2009 | Naslund | | B60R 9/048 |
| | | | | 224/319 |
| 8,882,070 B2 * | 11/2014 | Bean | | F41B 5/14 |
| | | | | 248/216.1 |
| 10,035,468 B2 * | 7/2018 | Mifsud | | B60R 9/058 |
| 2003/0201634 A1 | 10/2003 | Kramer | | |
| 2009/0090758 A1 * | 4/2009 | Bartholdy | | B60R 7/14 |
| | | | | 224/571 |
| 2011/0042432 A1 * | 2/2011 | Elezaj | | B60R 9/0423 |
| | | | | 224/321 |
| 2011/0214944 A1 * | 9/2011 | Levi | | B60R 9/0485 |
| | | | | 182/127 |
| 2012/0091178 A1 * | 4/2012 | Hancock | | B60R 9/06 |
| | | | | 224/401 |
| 2014/0030054 A1 * | 1/2014 | Levi | | B60R 9/0485 |
| | | | | 414/809 |
| 2014/0183237 A1 | 7/2014 | Wolfe et al. | | |
| 2017/0217379 A1 * | 8/2017 | Mifsud | | B60R 9/058 |
| 2017/0232904 A1 * | 8/2017 | Bharucha | | B60R 9/0485 |
| | | | | 224/310 |

* cited by examiner

HOLDING APPARATUS

CROSS REFERENCE TO RELATED APPLICATIONS

This application is the U.S. National Stage of International Application No. PCT/AU2016/050959, filed Oct. 13, 2016, which was published in English under PCT Article 21(2), and which claims the benefit of Australian Patent Application No. 2015904199, filed Oct. 14, 2015. Australian Patent Application No. 2015904199 is incorporated by reference herein in its entirety.

FIELD OF THE INVENTION

The present invention relates to an apparatus suitable for holding objects such as firearms. More particularly, the invention relates, but is not limited, to an apparatus for stably and accessibly holding an object such as a firearm during vehicular transport.

BACKGROUND OF THE INVENTION

Transport of equipment such as firearms in vehicles is important in a variety of circumstances. Stable holding during vehicular transport of equipment is critical to avoid problems including damage to the equipment.

For activities such as hunting and farm maintenance, firearms and other equipment are often transported using all-terrain vehicles (ATVs). Secure transport of equipment using ATVs can be particularly challenging. For example, such transport frequently involves traversing rough terrain, and such vehicles often have limited suspension. Therefore secure holding of equipment against substantial 'bumping' or 'jolting' forces is required. Furthermore, transport of equipment using ATVs is often used in 'rapid response' scenarios for which ease of access to a stored firearm can be critical.

Some existing apparatus for holding a firearm and/or other equipment during transport provide a high level of stability but do not allow rapid removal and use of the equipment. Other existing apparatus allow rapid removal and use of equipment, but provide insufficient holding stability during transport.

OBJECT OF THE INVENTION

It is an aim of this invention to provide an apparatus which overcomes or ameliorates one or more of the disadvantages or problems described above, or which at least provides a useful alternative. Other preferred objects of the present invention will become apparent from the following description.

SUMMARY OF INVENTION

In one form, although it need not be the only or indeed the broadest form, there is provided a holding apparatus mountable to a vehicle, said apparatus comprising:
one or more mounting members mountable to the vehicle;
one or more rear holding members;
one or more front holding members; and
one or more clamping actuators operatively associated with the front and/or rear holding members, wherein the one or more clamping actuators are capable of moving the front holding members and/or the rear holding members to thereby releasably, clampingly engage an object placed between the front and rear holding members.

In an embodiment, the mounting members of the apparatus are, or comprise, one or more support frames. Alternatively or additionally, the mounting members may be, or comprise, one or more base supports. Suitably, the support frames and/or the base supports are mountable to a vehicle.

In one preferred embodiment the apparatus comprises mounting members that are a spaced pair of support frames. Suitably, in this embodiment the spaced pair of support frames is mountable to a vehicle.

In another preferred embodiment the apparatus comprises a mounting member comprising a spaced pair of support frames mounted to a base support. Suitably, in this embodiment, the base support is mountable to a vehicle.

In some embodiments, the one or more mounting members of the apparatus are removably mountable to a vehicle.

Suitably, the one or more front holding members and/or the one or more rear holding members of the apparatus are moveable from an open configuration to clampingly engage an object placed between the front and rear holding members, and are moveable from clampingly engaging the object to an open configuration.

In a preferred embodiment the one or more front holding members and/or the one or more rear holding members of the apparatus are rotatably moveable to releasably, clampingly engage the object.

Preferably, the one or more front holding members and/or the one or more rear holding members of the apparatus are pivotally moveable to releasably, clampingly engage the object. In a preferred embodiment, the one or more front holding members are pivotally moveable relative to the one or more rear holding members, which are preferably incapable of pivotal movement.

Preferably, the one or more rear holding members of the apparatus are mounted to the one or more mounting members.

Preferably the rear holding members are substantially vertical or otherwise upright.

Preferably the apparatus comprises a spaced pair of rear holding members. Preferably each of the pair of rear holding members is mounted to a respective support frame of the one or more mounting members of the apparatus. Additionally or alternatively, the rear holding members may be mounted to a base support of the one or more mounting members.

Preferably, the rear holding members comprise clamping portions. Preferably a clamping surface of the respective clamping portions comprises an elastomer or other deformable material. Preferably, the elastomer or other deformable material provides a gripping and/or sealing function.

Preferably, the front holding members of the apparatus are moveable between a substantially upright, clamping position and an inclined open position.

Preferably, the apparatus comprises a spaced pair of front holding members.

Preferably, the front holding members comprise clamping portions. Preferably the clamping surface of the clamping portions comprises an elastomer or other deformable material. Preferably, the elastomer or other deformable material provides a gripping and/or sealing function.

Preferably the one or more clamping actuators of the apparatus are, or comprise, respective extendable struts. In a preferred embodiment the extendable struts are biased towards an extended conformation.

In one preferred embodiment, the apparatus comprises a single clamping actuator that is an extendable strut.

In another preferred embodiment, the apparatus comprises a spaced pair of clamping actuators that are respective extendable struts.

Preferably a first end of the extendable struts is engaged with a clamping actuator engaging portion of a respective front holding member of the apparatus.

Preferably a second end of the extendable strut is engaged with a respective clamping actuator mounting portion of a mounting member of the apparatus.

Preferably, when the front holding members of the apparatus are in the inclined, open position, the one or more extendable struts facilitate maintaining and/or stabilizing the inclined, open position.

In a preferred embodiment, the distance between a rotation axis of the front holding members of the apparatus and the rear holding members is adjustable. In this preferred embodiment, preferably the rotation axis of the front holding members is movable. Alternatively, or additionally, the rear holding members may be movable. In said embodiments, preferably the apparatus further comprises one or more adjustment actuators operatively associated with the front and/or rear holding members.

In some embodiments, the apparatus further comprises one or more rack members located between the front holding members and the rear holding members. Preferably the apparatus comprises a spaced pair of rack members.

In some embodiments the rack members may be components of the mounting members; the front holding members; and/or the rear holding members.

Preferably the rack members comprise a rack face and a body portion. Preferably a rack surface of the rack face comprises an elastomer or other deformable material.

In some embodiments, the apparatus further comprises one or more equipment rests.

Preferably the one or more equipment rests are, or comprise, one or more cross-members mounted to the front holding members and/or the rear holding members.

Preferably the apparatus comprises: a front equipment rest that is, or comprises, one or more cross-members mounted to the front holding members; and a rear equipment rest that is, or comprises one or more cross-members mounted to the rear holding members.

Preferably a rest surface of the cross-members comprises an elastomer or other deformable material.

In another aspect, there is provided a vehicle comprising the apparatus of the aforementioned form mounted thereto.

In yet another aspect there is provided a method for securing an object in a vehicle, including the steps of:

clampingly and releasably holding the object between one or more front holding members and one or more rear holding members of an apparatus, before or after mounting the apparatus to the vehicle, to thereby secure the object in the vehicle.

In still yet another aspect there is provided a method for holding an object in an apparatus mounted to a vehicle, including the steps of:

mounting an apparatus to the vehicle, the apparatus comprising one or more front holding members and one or more rear holding members, before or after clampingly and releasably holding the object between the one or more front holding members and one or more rear holding members, to thereby secure the object in the vehicle.

In preferred embodiments of the methods of these aspects the apparatus is of the aforementioned aspect.

In preferred embodiments of the preceding aspects, the object is a firearm.

In preferred embodiments of the preceding aspects, the vehicle is an all-terrain vehicle (ATV).

Further features and advantages of the present invention will become apparent from the following detailed description.

DETAILED DESCRIPTION OF THE DRAWINGS

Figure 1:
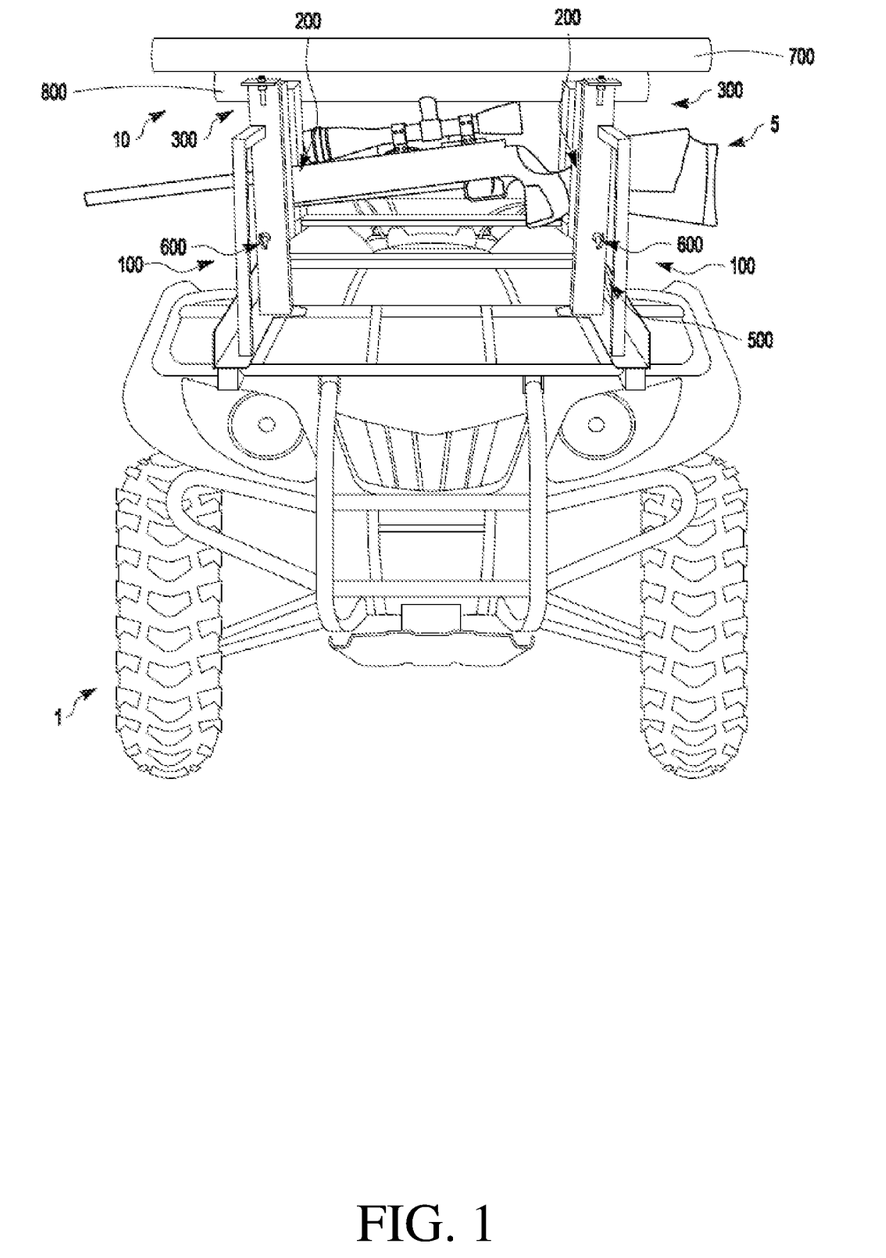
FIG. 1 shows an embodiment of an apparatus of the invention mounted to an ATV and clampingly holding an object in the form of a firearm.
Figure 2:
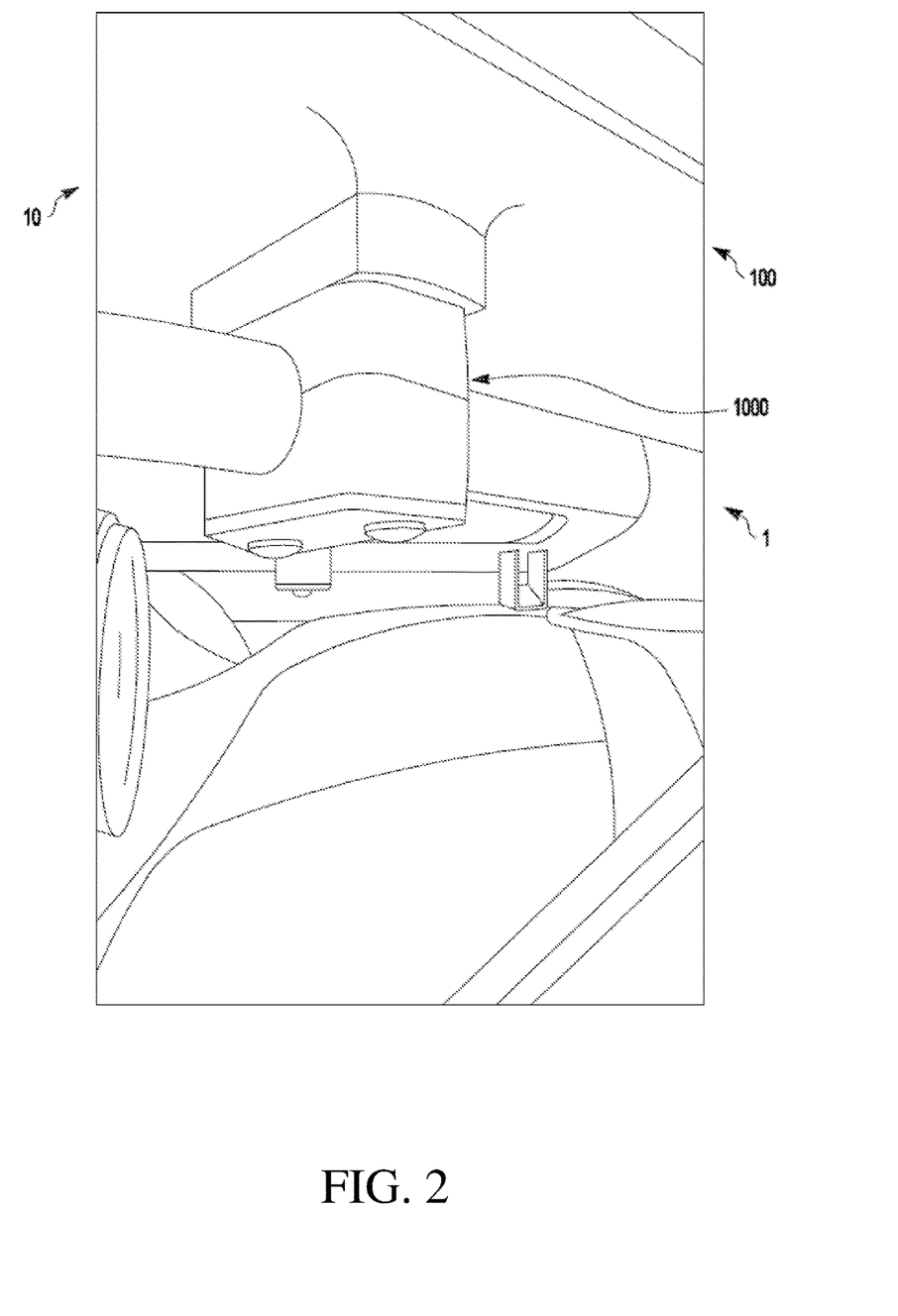
FIG. 2 is a close up view showing the mounting of the apparatus of FIG. 1 to an ATV.
Figure 3:
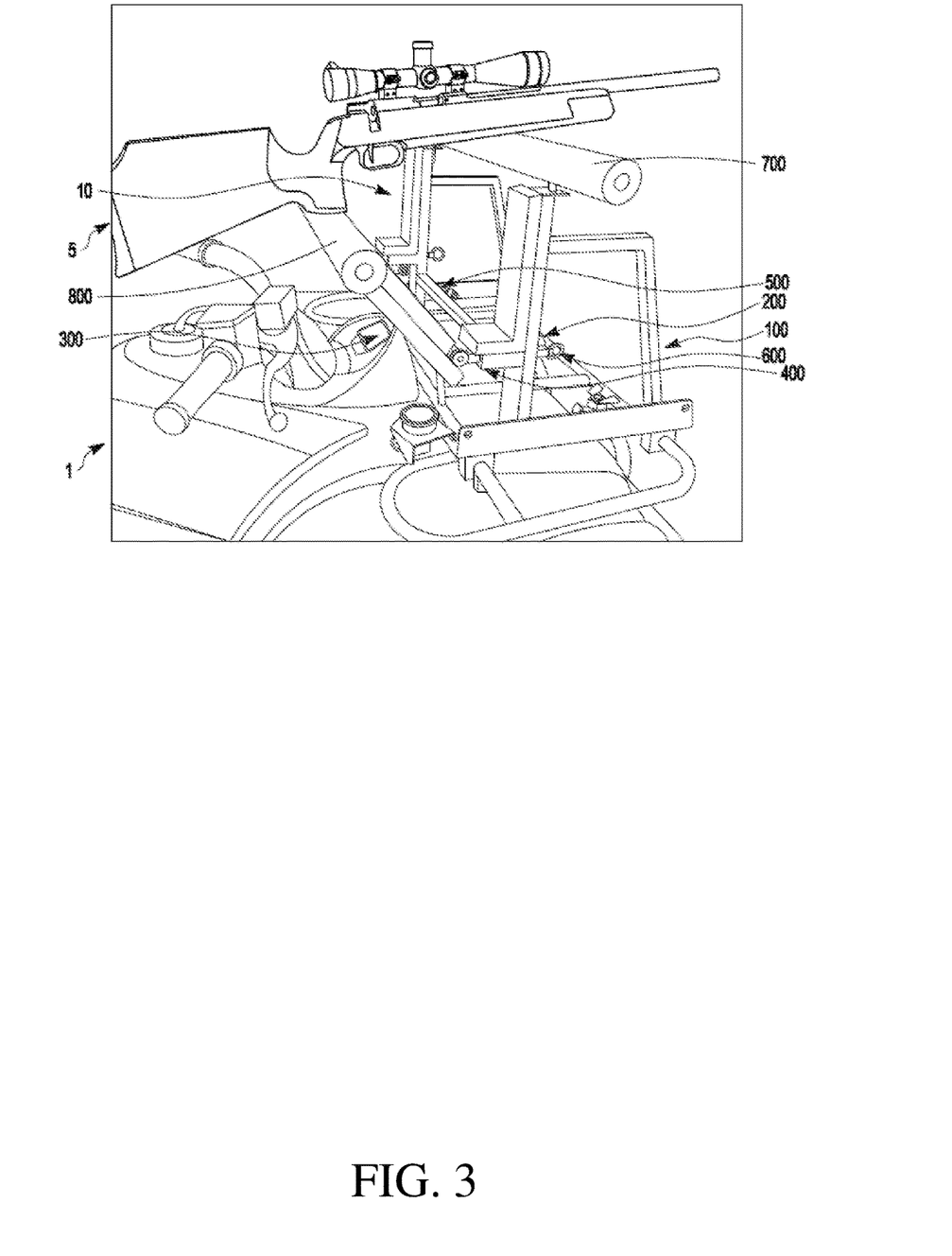
FIG. 3 shows an object in the form of a firearm resting on equipment rests of the apparatus of FIG. 1.

FIGS. 1-3 illustrate an embodiment of apparatus 10 mounted on vehicle 1.

As best seen in FIGS. 1 and 3, apparatus 10 comprises paired mounting members 100 that are support frames; paired rear holding members 200; paired front holding members 300; paired rack members 400; a single clamping actuator 500; paired adjustment actuators 600; rear equipment rest 700; and front equipment rest 800.

As shown in FIG. 2, mounting members 100 are clampingly mounted on a frame of vehicle 1 by fastener 1000, which is a stauff clamp. However, it will be appreciated that mounting members 100 may be mounted on a vehicle using other suitable fasteners. By way of non-limiting example, mounting members 100 may be mounted on a vehicle using bolts or screws.

In FIG. 1, an object in the form of firearm 5 is clampingly held between paired rear holding members 200 and paired front holding members 300. Although in FIG. 1 the object is in the form of firearm 5, it will be readily appreciated that apparatus 10 can be used for holding any other suitable object. Apparatus 10 is particularly adapted for holding objects which extend between each of the paired rear holding members 200 and front holding members 300, respectively. As such, elongated objects are particularly suitable for holding using apparatus 10, although without limitation thereto.

In addition to firearms, other non-limiting examples of objects which may be particularly suited for holding using apparatus 10 include tools, e.g. shovels, rakes, pitchforks, crowbars, hedge trimmers, saws, and axes; construction equipment such as ladders, sawhorses, and trestles; building materials such as planks, beams, and pipes; sporting equipment such as fishing rods, surfboards, golf clubs, hockey sticks, and cricket or baseball bats; beach and/or lifesaving equipment such as beach chairs, beach umbrellas, flags, flotation devices, and surf skis; and camping equipment such as tents, swags, and mattresses.

In FIG. 3, firearm 5 is resting on rear equipment rest 700 and front equipment rest 800. Although equipment rests 700 and 800 are particularly adapted for steadying a firearm in use, it will be appreciated that any other suitable equipment can be used with equipment rests 700 and 800.

FIGS. 4-10 illustrate further embodiments of apparatus 10 having similar rear holding members 200 and front holding members 300 to the embodiment shown in FIGS. 1-3, but wherein mounting member 100 comprises paired support frames 110 and base support 120.

Figure 4:
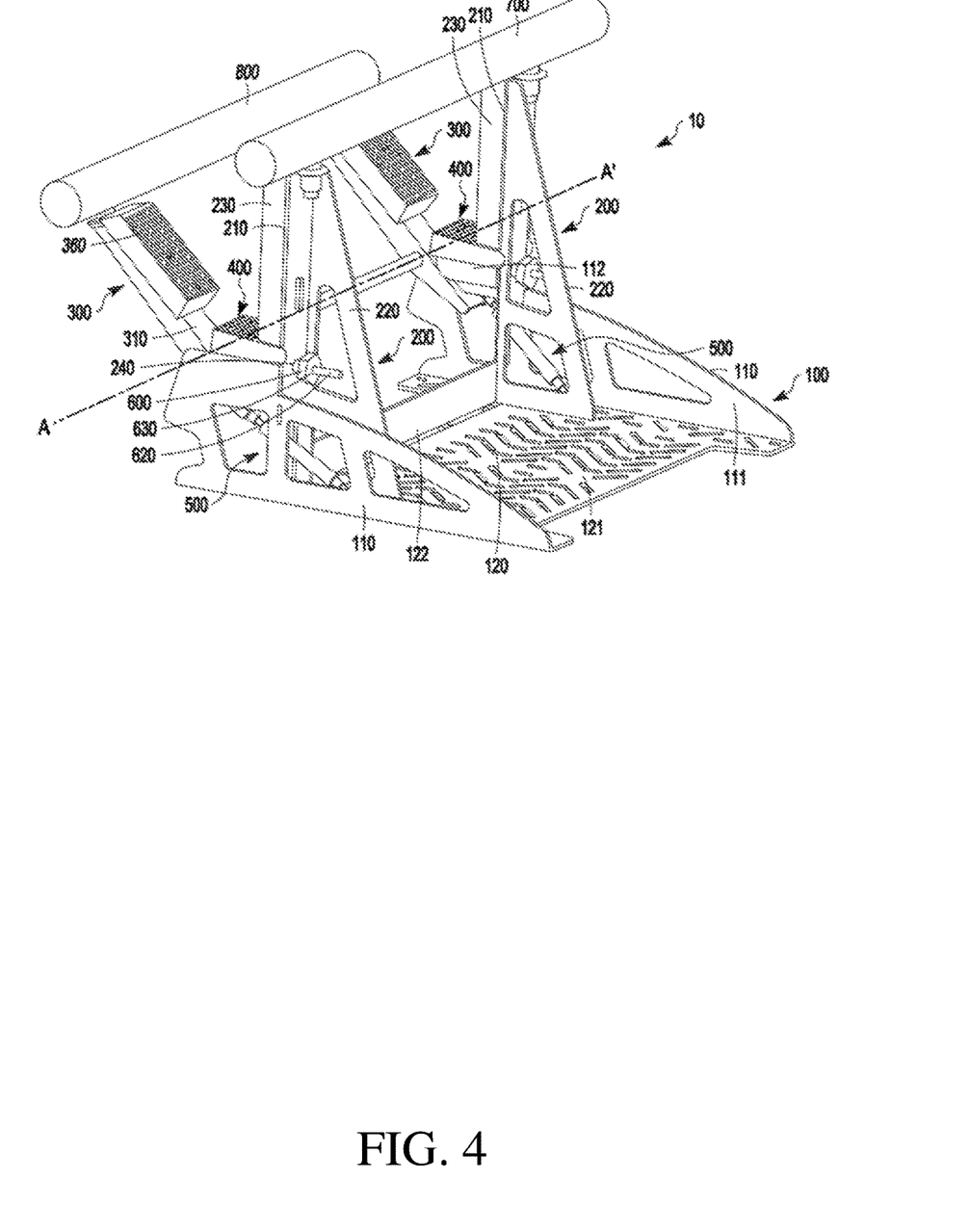
FIG. 4 shows a rear perspective view of another embodiment of an apparatus of the invention.
Figure 7:
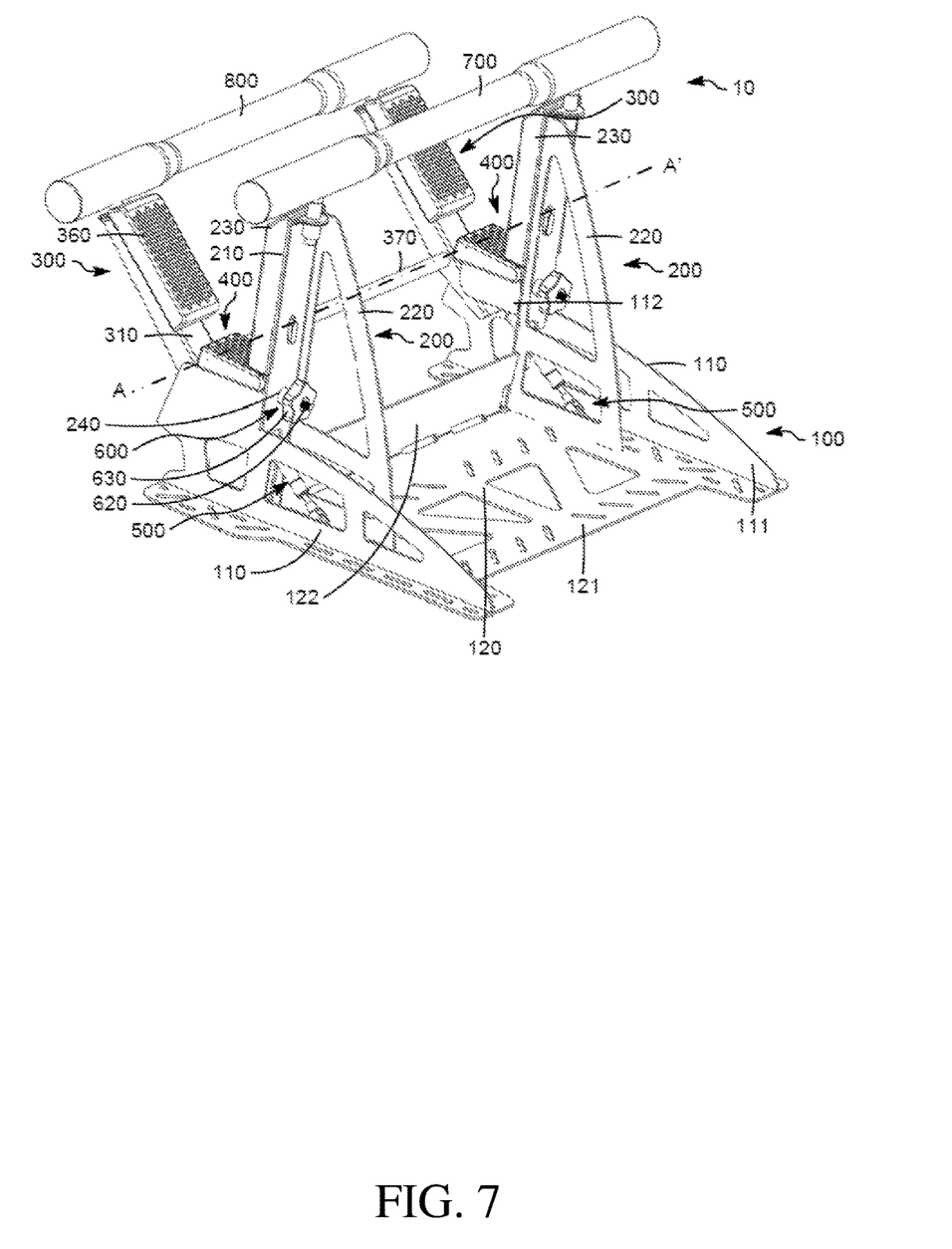
FIG. 7 is a rear perspective view of another embodiment of an apparatus of the invention
Figure 8:
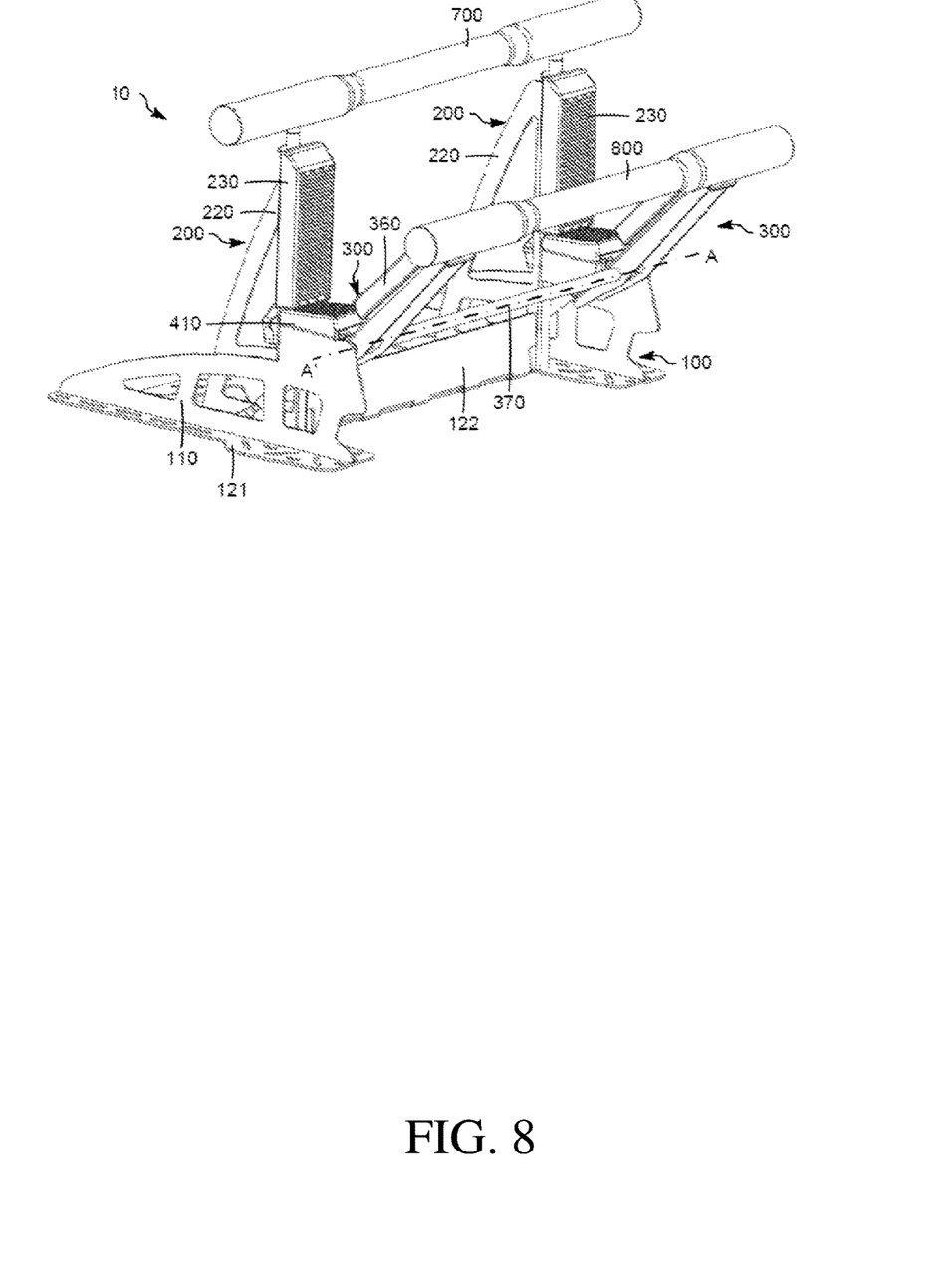
FIG. 8 is a front perspective view of the apparatus of FIG. 7.

As best seen in FIGS. 4 and 7, apparatus 10 comprises mounting member 100; paired rear holding members 200; paired front holding members 300; paired rack members 400; paired clamping actuators 500; paired adjustment actuators 600; rear equipment rest 700; and front equipment rest 800.

As hereinabove described and best seen in FIGS. 4-5 and 7-9, mounting member 100 comprises paired support frames 110; and base support 120. As best seen in FIGS. 4 and 7, paired support frames 110 comprise support frame inner faces 111; and rack mounting portions 112. Support frame inner faces 111 are substantially upright and opposed.

Figure 5:
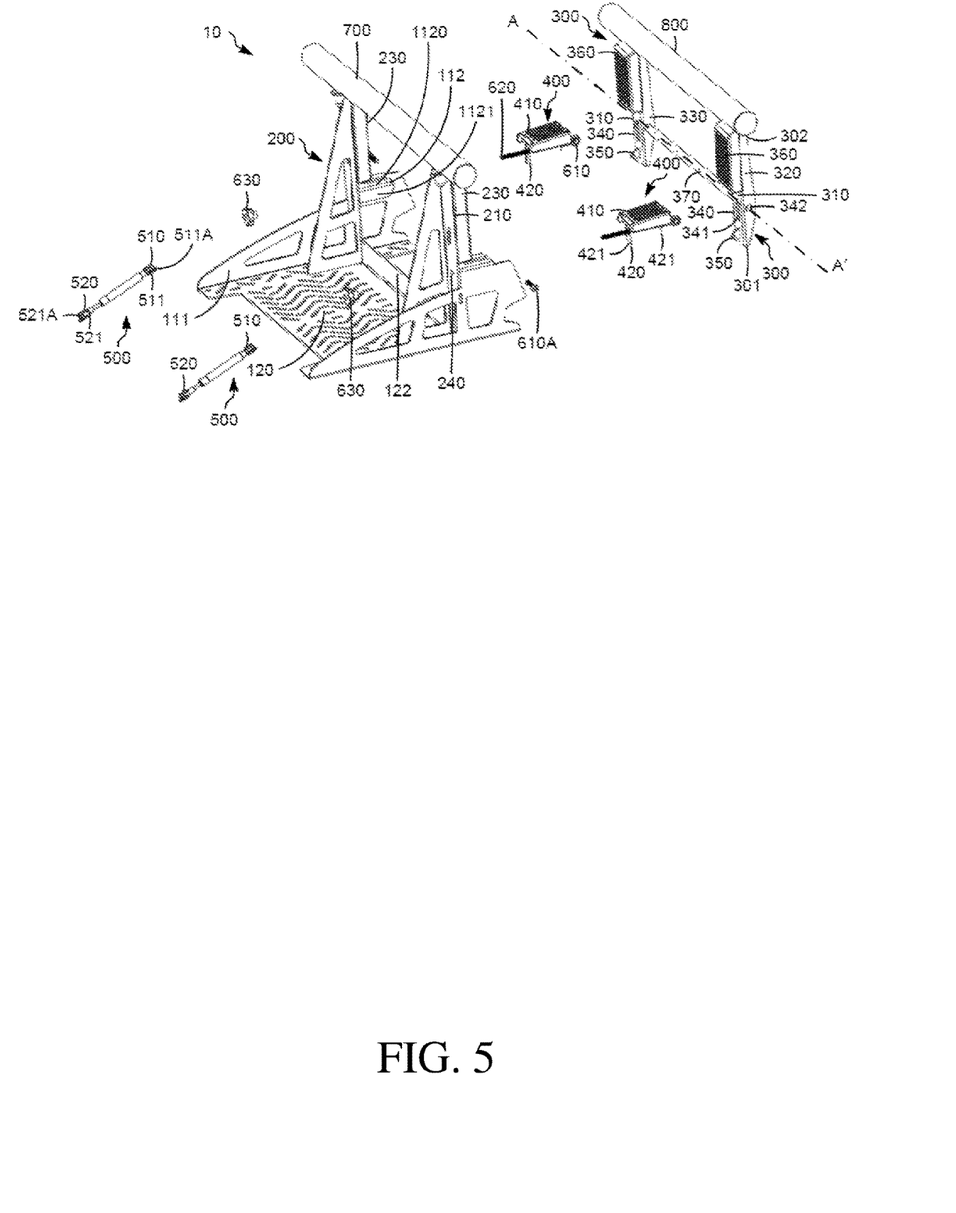
FIG. 5 is an exploded view of the apparatus of FIG. 4.
Figure 9:
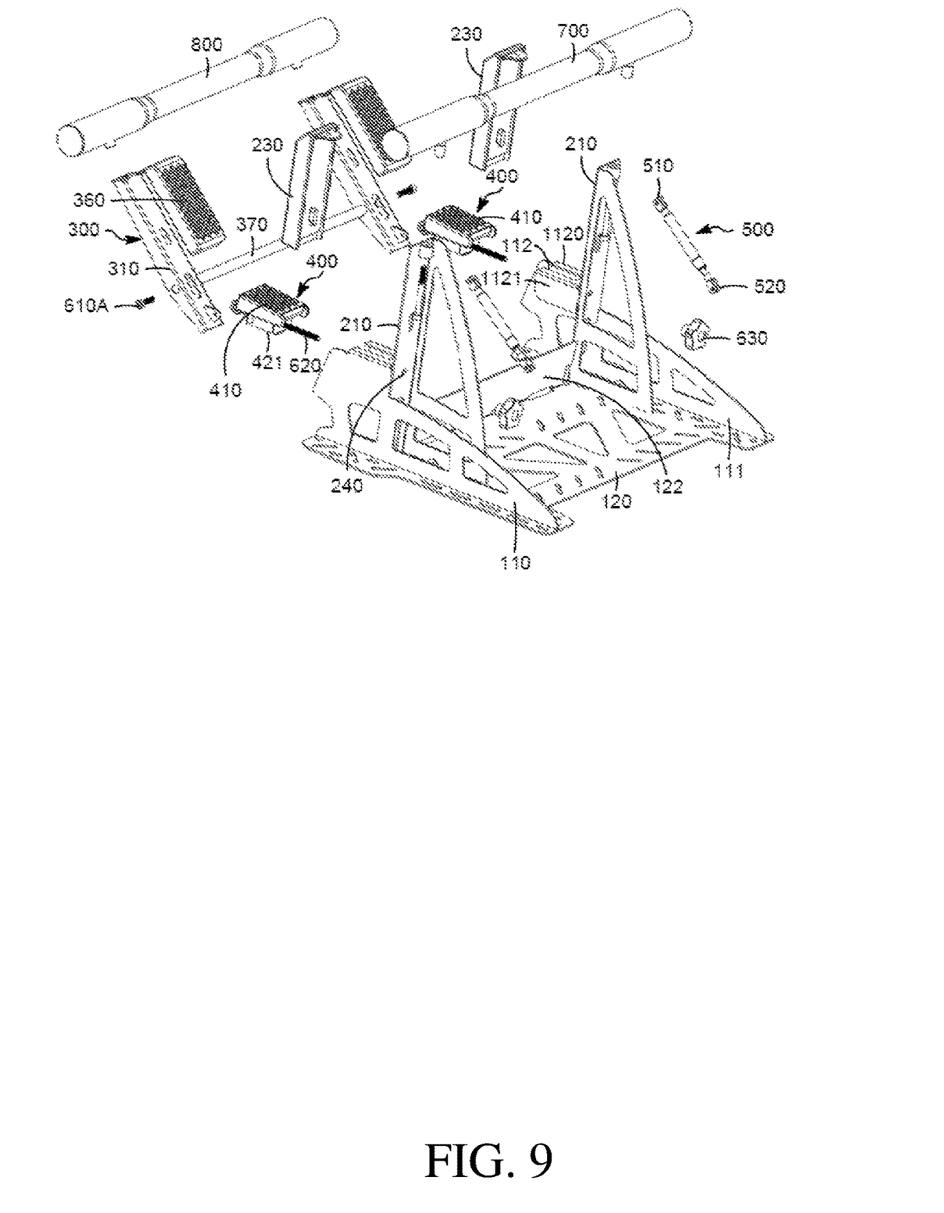
FIG. 9 is an exploded view of the apparatus of FIG. 7.
Figure 10:
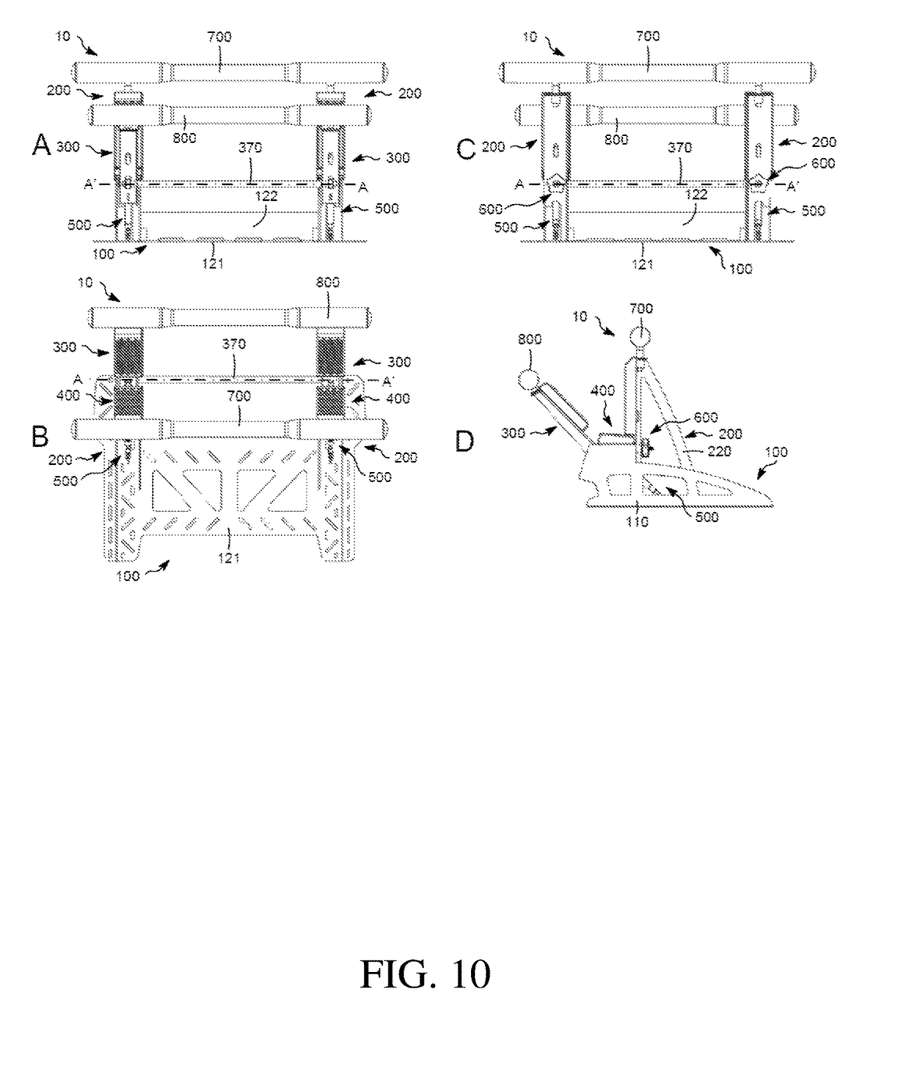
FIG. 10 shows A: a front plan view; B: a rear plant view; C; a top plan view; and D: a side plan view, of the apparatus of FIG. 7.

Rack mounting portion 112 of support frame 110 extends inwardly from support frame inner face 111. As best seen in FIGS. 5 and 9, rack mounting portion 112 has upper rack mounting face 1120 that extends from an upper edge of support frame inner face 111; and side rack mounting face 1121 that is substantially parallel to inner support frame face 111.

Base support 120 comprises base plate 121; wall 122; and paired clamping actuator mounting portions 123. Base plate 121 extends between respective lower edges of support frame inner faces 111. Wall 122 extends between paired rear holding members 200.

Figure 6:
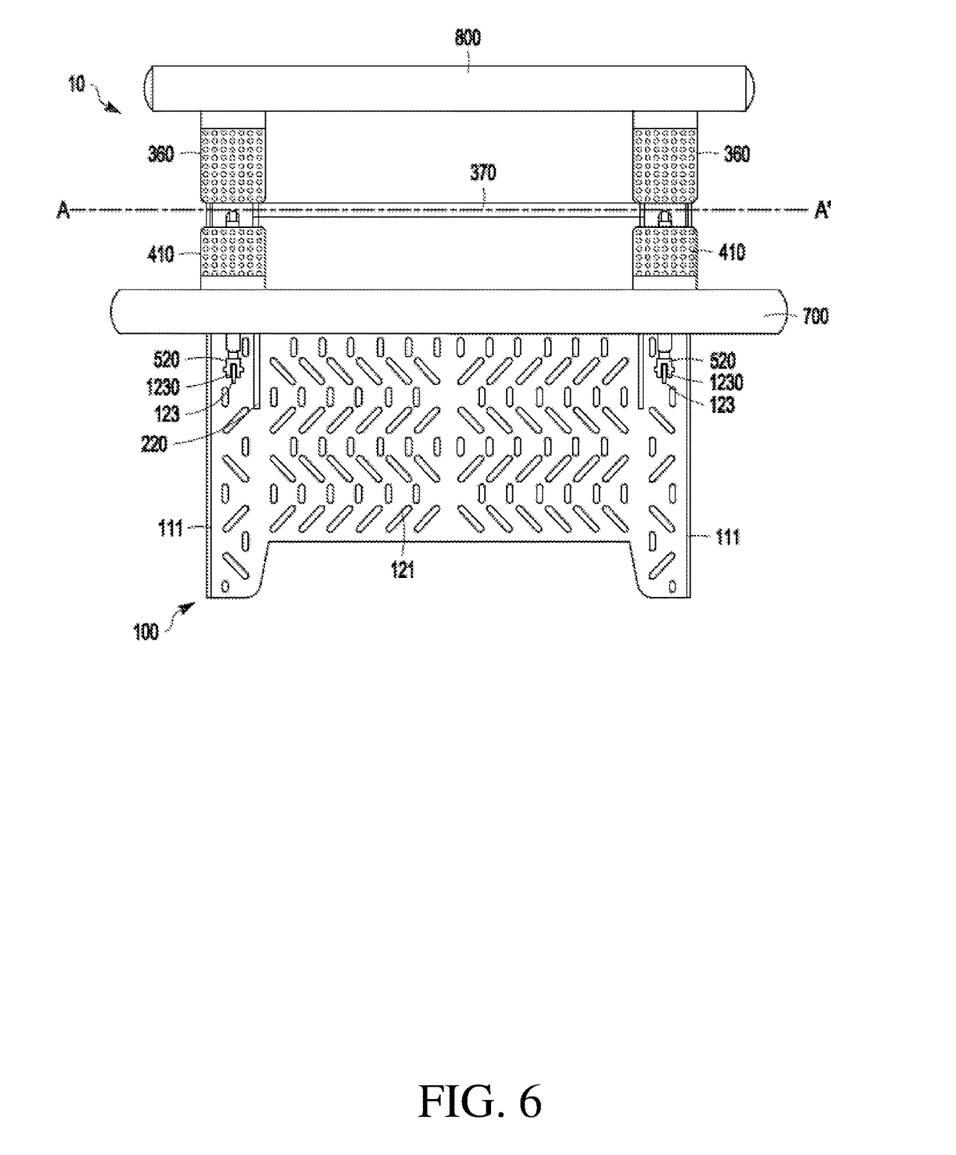
FIG. 6 is a top plan view of the apparatus of FIG. 4.

As best seen in FIG. 6, clamping actuator mounting portion 123 is a protrusion comprising an aperture rigidly mounted to base plate 121. Respective paired clamping actuator mounting portions 123 are located between respective support frame inner faces 111 and rear holding member side faces 220.

As best seen in FIGS. 4 and 7, paired rear holding members 200 are substantially upright and spaced apart. Paired rear holding members 200 comprise rear holding member front faces 210; rear holding member side faces 220; rear holding member clamping portions 230; and rear holding member adjustment actuator-engaging portions 240.

Rear holding member front faces 210 are substantially perpendicular to support frame inner faces 110. Rear holding member side faces 220 are substantially perpendicular to rear holding member front faces 110.

Rear holding member clamping portions 230 are mounted to respective rear holding member front faces 210. As depicted in the Figures, the clamping surface of rear holding member clamping portions 230 comprises foam rubber. However, it will be appreciated that in alternative forms other deformable material may be used.

Rear holding member adjustment actuator engaging portions 240 are apertures extending through rear holding member front faces 210.

Rear equipment rest 700 is mounted to upper ends of respective rear holding members 200. Rear equipment rest 700 extends between upper ends of respective rear holding members 200.

In certain embodiments, such as the embodiment of apparatus 10 depicted in FIG. 1, apparatus 10 may further comprise a rear holding member brace extending between the respective rear holding members, for example below rear equipment rest 700, where present.

Paired front holding members 300 comprise front holding member clamping faces 310; front holding member outer side faces 320; front holding member inner side faces 330; front holding member adjustment actuator engaging portions 340; front holding member clamping actuator engaging portions 350; front holding member clamping portions 360; and front holding member brace 370.

As best seen in FIG. 5, front holding member adjustment actuator engaging portion 340 is located towards a first end 301 of front holding member 300. Front holding member adjustment actuator engaging portion 340 comprises adjustment actuator engaging slot 341 in front holding member clamping face 310; and adjustment actuator engaging aperture 342 extending through front holding member outer side face 320.

Front holding member clamping actuator engaging portions 350 are protrusions comprising apertures mounted to respective front holding member clamping faces 310. Front holding member clamping actuator engaging portions 350 are located further towards first end 301 of front holding member 300 from adjustment actuator engaging portion 340.

Front holding member clamping portions 360 are mounted to front holding member clamping faces 310. Front holding member clamping portions 360 extend from second ends 302 of front holding member 300 along front holding member clamping faces 310.

As pictured in the Figures, the clamping surfaces of front holding member clamping portion 360 comprise foam rubber. However, it will be appreciated that in alternative forms other deformable material may be used.

Front holding member brace 370 extends between respective front holding member inner side faces 330. Front holding member brace 370 is aligned with respective adjustment actuator engaging apertures 342 and extends along rotation axis A-A' of front holding members 300.

Front equipment rest 800 is mounted to front holding members 300. Front equipment rest 800 extends between second ends 302 of respective front holding members 300.

As seen most clearly in FIGS. 4 and 7, paired rack members 400 are mounted to respective rack mounting portions 112 of support frames 110.

As seen most clearly in FIG. 5, paired rack members 400 comprise respective upper rack faces 410; and body portions 420.

Upper rack faces 410 are substantially perpendicular to rear holding member front faces 210. As pictured in the Figures, the rack surface of upper rack faces 410 comprises foam rubber. However, it will be appreciated that in alternative forms another deformable material may be used.

Rack member body portions 420 comprise paired vertical extensions 421. Rack member body portion engages with a rack mounting slot of upper rack mounting face 1120 of respective support frame 110.

As seen most clearly in FIGS. 5 and 9, paired clamping actuators 500 are extendable struts comprising respective first and second ends 510 and 520. Extendable struts 500 are biased towards an extended orientation. As pictured in the Figures extendable struts 500 are gas struts, however it will be appreciated that in alternative embodiments other suitable extendable struts may be used.

Extendable strut first end 510 is rotatably engaged with respective front holding member clamping actuator engaging portion 350.

Extendable strut first end first end 510 comprises aperture 511 which is engaged with an aperture of front holding member clamping actuator engaging portion 350 via first clamping actuator pin 511A.

Extendable strut second end 520 is rotatably engaged with respective base support clamping actuator mounting portion 123.

Extendable strut second end 520 comprises aperture 521 which is engaged with aperture 1230 of base support clamping actuator engaging portion 123 via second clamping actuator pin 521A.

As best seen in FIGS. 4-5, and 7 and 9, paired adjustment actuators 600 comprise front holding member engaging portion 610, coupling members 620 which are threaded fasteners, and actuating nut 630.

Adjustment actuator front holding member engaging portion 610 is rotatably engaged with adjustment actuator engaging portion 340 of respective front holding member 300. Adjustment actuator front holding member engaging portion 610 extends through adjustment actuator engaging slot 341, and engages with adjustment actuator engaging aperture 342 via bolt 610A.

Actuating nut 630 engages with coupling member 620 adjacent to rear holding member 200 at a position opposed to rear holding member front face 210.

In use, apparatus 10 can be mounted by mounting member 100 on a vehicle in any suitable fashion. By way of non-limiting example, mounting member 100 can be mounted on a vehicle using one or more suitable fasteners.

In some embodiments, mounting member 100 is mounted on a vehicle using bolts or screws. Such mounting of mounting member 100 may be particularly suitable for mounting apparatus 10 to a flat surface of a vehicle.

Mounting member 100 may also be mounted to a frame of a vehicle. It will be appreciated that mounting member 100 may be clampingly mounted to a frame of vehicle, similar to as depicted for the embodiment of apparatus 10 depicted in FIG. 2.

It will be further appreciated that mounting member 100 can be removably mounted to a vehicle. By way of non-limiting example, mounting member 100 may be mounted to a vehicle using releasable clamps. Mounting member 100 may also be slidably mounted to a vehicle using rails.

Base plate 120 of mounting member 100 is particularly adapted for mounting apparatus 10 to a vehicle. However, support frames 110 may additionally or alternatively be used for mounting apparatus 10 to a vehicle.

It will be further appreciated that mounting member 100 need not be mounted on a vehicle. Mounting member 100 can alternatively support apparatus 10 on any suitable surface.

In use, an object such as a firearm can be held between front holding member 300 and rear holding members 200. Suitably, the object is placed on paired rack members 400. Suitably, the object extends between respective rack members 400. For example, in the particular case wherein a firearm is held between front holding members 300 and rear holding members 200, suitably the longitudinal axis of the firearm extends between respective rack members 400.

In use, when an object such as a firearm is placed between front holding member 300 and rear holding member 200, and front holding member 300 is positioned in the substantially upright clamping position, front holding member clamping portions 360 exert a force on the object towards rear holding members 200, and rear holding member clamping portions 230 exert an opposing force on the object towards front holding members 300, thereby holding the object securely.

In use, pivotal movement of front holding members 300 about rotation axis A-A' can move front holding member 300 from the substantially upright clamping position to an inclined, open position. As shown in FIGS. 4 and 7, for example, front holding members 300 are in the inclined, open position.

As front holding members 300 are pivoted about rotation axis A-A' in a first direction from the substantially upright clamping position towards the inclined, open position, extentable struts 500 contract and the orientation of extendable struts 500 moves towards dead centre. At dead centre, the length of extendable struts 500 is at a minimum.

In use, when front holding members 300 are pivoted in the first direction from the substantially upright clamping position to the open, inclined position, the orientation of extendable struts 500 passes dead centre, and the length of extendable struts 500 increases relative to the length of extendable struts 500 in the dead centre orientation.

In use, extension of extendable struts 500 can stabilize front holding members 300 in the substantially upright clamping position, or the open inclined position.

In use, when front holding member 300 is positioned in the inclined, open position, upon gentle force exerted to rotate front holding members 300 towards the substantially upright, clamping position, the orientation of clamping actuators 500 passes dead centre, and the extension of clamping actuators 500 returns front holding members to the substantially upright, clamping position.

In use, adjustment actuators 600 can be actuated to adjust the distance between rotation axis A-A' of front holding members 300 and rear holding members 200, whereby objects of varying sizes can be held between front holding members 300 and rear holding member 200.

Rotation of actuating nut 630 in a first direction increases the length of the portion of coupling member 620 located between rear holding member adjustment actuator engaging portion 240 and front holding member adjustment actuator engaging portion 340, which increases the distance between rotation axis A-A' of front holding members 400 with respect to rear holding members 300.

In use, rotation of actuating nut 630 in a second direction, opposite the first direction, decreases the length of the portion of coupling member 620 located between rear holding member adjustment actuator engaging portion 240 and front holding member adjustment actuator engaging portion 340, which decreases the distance between rotation axis A-A' of front holding members 300 with respect to rear holding members 200.

Advantageously, base support 120 is adapted for mounting apparatus 10 on an ATV. By way of non-limiting example, base plate 120 can be stably mounted to the front end of an ATV using one or more suitable fasteners as hereinbefore described. Advantageously, when apparatus 10 is suitably mounted on a vehicle such as an ATV, cargo, such as in the form of a rectangular container, can be stored on base plate 121 behind wall 122.

Advantageously, a suitable object, such as a firearm, placed on rack members 400 between front holding members 300 and rear holding members 200 can be held securely by front holding member clamping portions 360 and rear holding member clamping portions 230.

Advantageously, the force exerted by respective front and rear holding members 360 and 230 is sufficient to stably hold a suitable object against substantial jolting and bumping forces. By way of non-limiting example, said force is sufficient to stably hold a firearm when traversing rough terrain in an ATV. Advantageously, such stable holding can protect a firearm or other suitable object from damage.

Advantageously, adjustment of the distance between rotation axis A-A' of front holding members 300 and rear folding members 200 allows apparatus 10 to hold objects of various sizes.

Advantageously, an object held by apparatus 10 can be easily accessed by a user by rotation of front holding members 300 towards the inclined, open position. By way of non-limiting example, front holding members 300 may be rotated by a user towards the inclined, open position with a single hand by grasping front equipment rest 800.

Advantageously, the accessibility of an object held by apparatus 10 makes apparatus 10 highly suitable for rapid response type scenarios such as transport of a firearm or other equipment on an ATV during farm maintenance or hunting, although without limitation thereto.

Advantageously, front holding members 300 may be returned from the inclined, open position towards the substantially upright, clamping position by gentle force from a user. By way of non-limiting example, front holding members 300 may be returned towards a closed position by a single gentle push on front equipment rest 800.

Advantageously, rear equipment rest 700 and/or front equipment rest 800 can support equipment such as a firearm in use. By way of non-limiting example, when apparatus 10 is mounted to a vehicle such as an ATV, equipment rest 700 and/or 800 can provide a platform for aiming and/or firing a firearm. As hereinbefore described, FIG. 3 shows firearm 5 resting on equipment rests 700 and 800 of an embodiment of apparatus 10 of the invention mounted on vehicle 1.

In this specification, adjectives such as first and second, left and right, top and bottom, front and rear and the like may be used solely to distinguish one element or action from another element or action without necessarily requiring or implying any actual such relationship or order. Where the context permits, reference to an integer or a component or step (or the like) is not to be interpreted as being limited to only one of that integer, component, or step, but rather could be one or more of that integer, component, or step etc.

In this specification, the terms 'comprises', 'comprising', 'includes', 'including', or similar terms are intended to mean a non-exclusive inclusion, such that a method, system or apparatus that comprises a list of elements does not include those elements solely, but may well include other elements not listed.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. The invention is intended to embrace all alternatives, modifications, and variations of the present invention that have been discussed herein, and other embodiments that fall within the spirit and scope of the above described invention.

The invention claimed is:

1. A holding apparatus mountable to a vehicle, said apparatus comprising:
one or more mounting members mountable to the vehicle;
one or more rear holding members;
one or more front holding members; and
one or more clamping actuators operatively associated with the one or more front holding members and/or the one or more rear holding members,
wherein the one or more clamping actuators are capable of moving the one or more front holding members and/or the one or more rear holding members to thereby releasably, clampingly engage an object placed between the one or more front holding members and the one or more rear holding members,
wherein the one or more front holding members and/or the one or more rear holding members are pivotally moveable to releasably, clampingly engage the object, and
wherein a distance between a rotation axis of the front holding members and the rear holding members is adjustable.

2. The apparatus of claim 1, wherein the one or more mounting members comprise one or more support frames and/or one or more base supports.

3. The apparatus of claim 2, wherein the mounting member of the apparatus comprises a spaced pair of support frames and a base support, and wherein the support frames are mounted to the base support.

4. The apparatus of claim 1, wherein the one or more front holding members are pivotally moveable relative to the one or more rear holding members, and the one or more rear holding members are incapable of pivotal movement.

5. The apparatus of claim 1, wherein the one or more mounting members comprise a base support, and wherein the one or more rear holding members are substantially upright relative to the base support.

6. The apparatus of claim 1, wherein the apparatus comprises a spaced pair of rear holding members.

7. The apparatus of claim 1, wherein the one or more mounting members comprise a base support, and wherein the one or more front holding members are moveable between a substantially upright, clamping position and an inclined open position relative to the base support.

8. The apparatus of claim 1, wherein the apparatus comprises a spaced pair of front holding members.

9. The apparatus of claim 1 wherein the one or more clamping actuators are extendable struts.

10. The apparatus of claim 1, wherein the apparatus further comprises one or more adjustment actuators operatively associated with the one or more front holding members and/or the one or more rear holding members.

11. The apparatus of claim 1, wherein the apparatus further comprises one or more equipment rests.

12. A method for securing an object in a vehicle, including the steps of:
clampingly and releasably holding the object between the one or more front holding members and the one or more rear holding members of the apparatus of claim 1, before or after mounting the apparatus to the vehicle, to thereby secure the object in the vehicle.

13. A method for holding an object in an apparatus mounted to a vehicle, including the steps of:
mounting the apparatus of claim 1 to the vehicle before or after clampingly and releasably holding the object between the one or more front holding members and the one or more rear holding members, to thereby secure the object in the vehicle.

* * * * *